No. 766,355. PATENTED AUG. 2, 1904.
C. HÜLSMEYER.
TELEPHONOGRAM APPARATUS.
APPLICATION FILED OCT. 13, 1902.
NO MODEL.
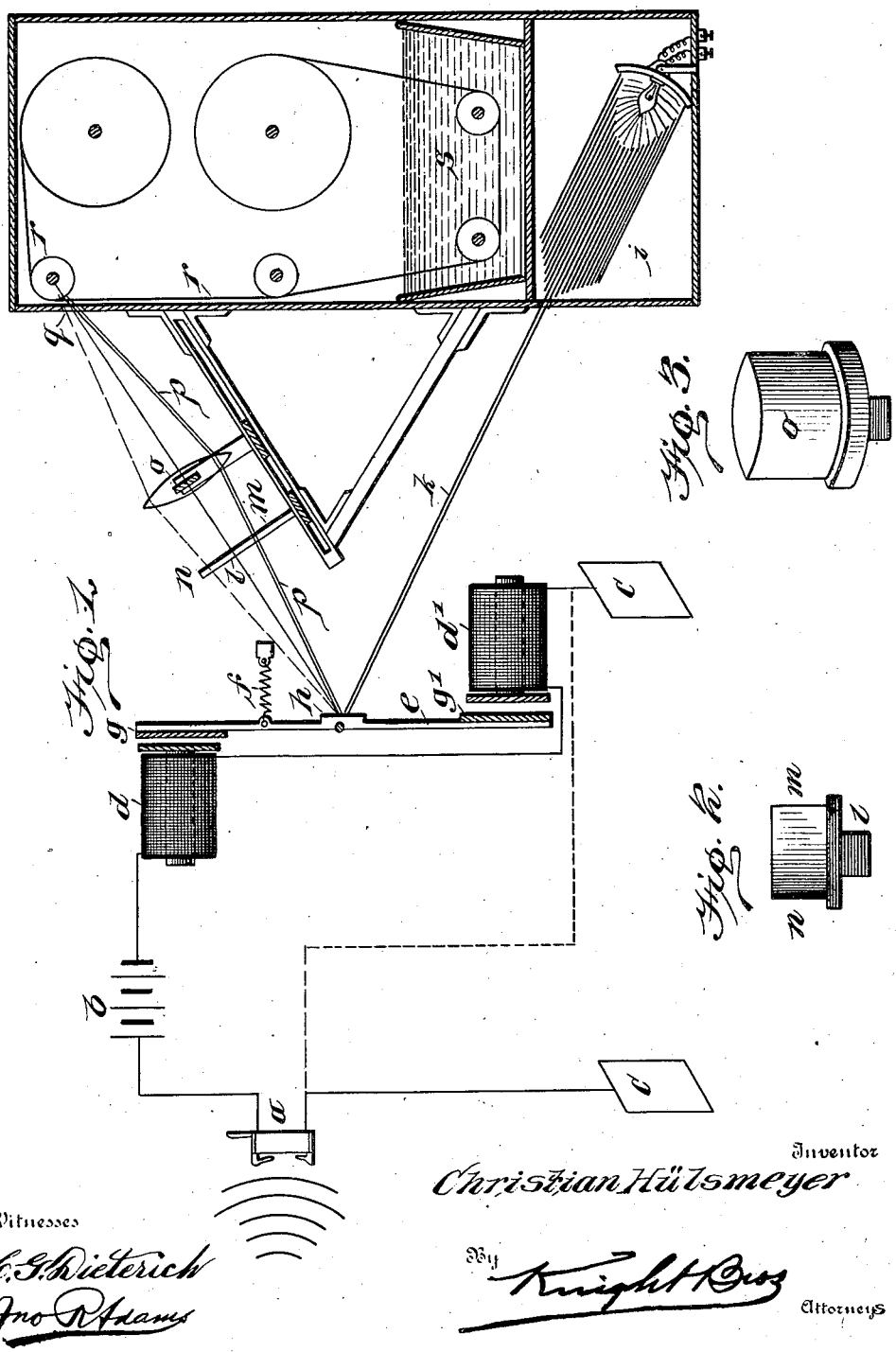
Witnesses
Inventor
Christian Hülsmeyer
By Knight Bros
Attorneys No. 766,355. Patented August 2, 1904.

UNITED STATES PATENT OFFICE.

CHRISTIAN HÜLSMEYER, OF DÜSSELDORF, GERMANY.

TELEPHONOGRAM APPARATUS.

SPECIFICATION forming part of Letters Patent No. 766,355, dated August 2, 1904.

Application filed October 13, 1902. Serial No. 127,117. (No model.)

*To all whom it may concern:*

Be it known that I, CHRISTIAN HÜLSMEYER, engineer, a subject of the King of Prussia, Emperor of Germany, residing at Bilker Allee 98, Düsseldorf, in the Kingdom of Prussia, Germany, have invented certain new and useful Improvements in Telephonogram Apparatus, of which the following is a full, clear, and exact description.

This invention relates to apparatus for the conversion of variations in the intensity of electric current into variations in the intensity of light.

In the devices hitherto known for the conversion of variations of current intensity into variations in light intensity there have been used either polarized, dispersion, or throttle devices. These, however, fulfil the requirements made of them only imperfectly, because with them not the quality but the quantity of the bundle of rays is controlled according to the variations of the current. For a perfect action of such devices it seems necessary that the control should proceed in direct or inverse proportion to the current variations, which in the device forming the present invention is attained by causing the bundle of rays falling upon a mirror which oscillates in accordance with the current variations of the electromagnets to be absorbed or transmitted by a fixed plate the transparency or power of absorption of which continuously increases or diminishes corresponding to the sine of the angle of incidence. If the arrangement is for the purpose of throwing such rays through an aperture upon a sensitive plate or film, then behind the said plate or film a system of prisms or lenses is arranged which concentrates the bundle of rays determined according to its quality upon a given point. The arrangement is preferably so constructed that by altering the distance between the mirror and the plate or prism system and the light-aperture the sensitiveness of the apparatus may be adjusted within the widest limits according to the requirement without alteration of the mechanical parts.

The accompanying drawings show in Figure 1 an arrangement of the kind set forth diagrammatically illustrated, while Fig. 2 is a detail view of the plate of varying transparency, and Fig. 3 is a detail view of the cylindrical lens.

Two stations are connected with one another either by a double-wire connection or a single wire, with the earth as return connection. If the caller speaks into the telephone or microtelephone $a$, the constant current of the line-battery $b$ is subjected to variations of intensity, which result in varying the power of attraction of the electromagnets $d\ d'$, which are inserted in series in the line-current. Opposite the electromagnets $d\ d'$ is placed an equal-armed lever $e$, which, controlled by the spring $f$, can oscillate easily to and fro. At both ends the said lever carries two soft-iron plates $g\ g'$ and on its axis of revolution a little mirror $h$. The entire apparatus of the receiving-station is placed in a dark chamber. Out of a light chamber $i$ there is projected through a slit a bundle of rays K upon the mirror $h$, which rays are reflected out again at the same angle. The reflected ray $p$ then penetrates a plate $l$, Fig. 2, the transparency of which constantly decreases from $m$ to $n$, and this in such a manner that the same is equal to unity at $m$ and is equal to zero at $n$. By means of a cylinder-lens $o$ the bundle of rays is constantly refracted toward a line $q$, Figs. 1 and 3. At the point $q$ there is caused to pass uniformly a sensitive strip $r$ by means of a clockwork or an electromotor, which band is then drawn through the fixing-bath $s$ and wound up in the manner of the cinematograph.

The operation of the photochemical fixing is as follows: The variations of resistance arising through the sound-waves in the microphone $a$ causes variations of intensity of the line-current, which are indicated by the varying attraction-power of the electromagnets $d\ d'$. The lever $e$ is consequently more or less attracted, and therefore the bundle of rays $p$ is more or less drawn away from its position of rest. In accordance with the deviation the bundle of rays $p$ is more or less absorbed by the plate $l$, and consequently also the sensitive band $r$ is more or less darkened. If then the band $r$, which has been exposed to light and fixed, be passed in the well-known manner between a selenium-cell and a source of light, the telephonogram will be again heard in a telephone inserted in a constant-current circuit. As has been already stated, the distance between the mirror $h$ and the plate $l$ or between the prism system $o$ and the light-aperture $q$ should be adjustable. By this means the sensitiveness of the apparatus can be adjusted within the widest limits according to the requirement without alteration of the mechanical parts. This may be effected in the most simple manner by arranging the plate $l$ and the cylinder-lens $o$, together with the fixing arrangement, adjustably upon a frame.

What I claim, and desire to secure by Letters Patent, is—

1. In a telephonogram apparatus the combination of a telephone-circuit, a mirror, means operated by said circuit for oscillating the mirror, means for throwing a constant bundle of rays on said mirror, means for concentrating to a band the rays reflected by the mirror, means of unequal transparency, between said mirror and said concentrating means for varying the intensity of the light, and a sensitive film for receiving the rays when concentrated.

2. In a telephonogram apparatus, the combination of a telephone-circuit, a mirror, means operated by said circuit for oscillating the mirror, means for throwing a constant bundle of rays of light on said mirror, a lens system for concentrating to a band the rays reflected by the mirror, a transparent plate between the mirror and the lens system, the transparency of said plate increasing or diminishing continuously corresponding to the sine of the angle of incidence, and a sensitive film for receiving the rays when concentrated.

3. In a telephonogram apparatus the combination of a telephone-circuit, electromagnetic means in said circuit, an oscillating lever, a spring controlling said lever, armatures on said lever arranged opposite the electromagnetic means, a mirror on the axis of revolution of the lever, means for throwing a constant bundle of rays of light on the mirror, a lens system for collecting the rays reflected by the mirror, a transparent plate between the mirror and the lens system, the transparency of said plate increasing or diminishing continuously corresponding to the sine of the angle of incidence, means for adjusting said transparent plate and lens system, a sensitive film for receiving the rays when concentrated, and means for rotating said film and leading it through a fixing-bath when exposed.

4. In a telephonogram apparatus, the combination of a telephone-circuit, a mirror, solenoids in said circuit for oscillating said mirror, a cylinder-lens for converging the reflected rays to a line, means of unequal transparency between said lens and said mirror, and a sensitive film.

In witness whereof I subscribe my signature in presence of two witnesses.

CHRISTIAN HÜLSMEYER.

Witnesses:
CARL SCHMITT,
GUSTAV SINNHOLD.